United States Patent
Nara et al.

(10) Patent No.: US 12,344,811 B2
(45) Date of Patent: Jul. 1, 2025

(54) REFRIGERATOR OIL AND WORKING FLUID COMPOSITION FOR REFRIGERATOR

(71) Applicant: ENEOS Corporation, Tokyo (JP)

(72) Inventors: Fumiyuki Nara, Tokyo (JP); Yohei Shono, Tokyo (JP); Hidetoshi Ogata, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 0 days.

(21) Appl. No.: 18/266,948

(22) PCT Filed: Dec. 20, 2021

(86) PCT No.: PCT/JP2021/047024
§ 371 (c)(1),
(2) Date: Jun. 13, 2023

(87) PCT Pub. No.: WO2022/138560
PCT Pub. Date: Jun. 30, 2022

(65) Prior Publication Data
US 2023/0365886 A1 Nov. 16, 2023

(30) Foreign Application Priority Data
Dec. 24, 2020 (JP) ................. 2020-214689

(51) Int. Cl.
| | | |
|---|---|---|
| *C10M 169/04* | (2006.01) | |
| *C09K 5/04* | (2006.01) | |
| *C10M 101/02* | (2006.01) | |
| *C10M 137/10* | (2006.01) | |
| *C10N 30/06* | (2006.01) | |
| *C10N 40/30* | (2006.01) | |

(52) U.S. Cl.
CPC .......... *C10M 169/04* (2013.01); *C09K 5/042* (2013.01); *C10M 101/02* (2013.01); *C10M 137/105* (2013.01); *C09K 2205/12* (2013.01); *C10M 2203/1025* (2013.01); *C10M 2223/041* (2013.01); *C10M 2223/047* (2013.01); *C10N 2030/06* (2013.01); *C10N 2040/30* (2013.01)

(58) Field of Classification Search
CPC ................ C09K 5/042; C10N 2040/30; C10N 2020/04; C10N 2030/06; C10N 2030/02; C10N 2020/103; C10N 2020/02; C10M 129/56; C10M 101/00; C10M 171/008; C10M 2203/1025; C10M 2209/086; C10M 2205/028
See application file for complete search history.

(56) References Cited

U.S. PATENT DOCUMENTS

| | | | | |
|---|---|---|---|---|
| 2009/0111723 A1* | 4/2009 | Shibata | ................ | C10M 101/02 585/16 |
| 2010/0093568 A1* | 4/2010 | Tagawa | .............. | C10M 171/008 508/459 |
| 2017/0009144 A1* | 1/2017 | Aalto | ....................... | C10G 3/42 |
| 2020/0354645 A1 | 11/2020 | Shono et al. | | |
| 2020/0369979 A1 | 11/2020 | Nara et al. | | |

FOREIGN PATENT DOCUMENTS

| | | |
|---|---|---|
| CN | 101415807 | 8/2015 |
| EP | 3578626 | 12/2019 |
| JP | 2019-104777 A | 6/2019 |
| WO | 2006/062245 A1 | 6/2006 |
| WO | 2007/105452 A1 | 9/2007 |
| WO | 2019/156126 A1 | 8/2019 |

OTHER PUBLICATIONS

ISR issued in International Patent Application No. PCT/JP2021/047024, Mar. 8, 2022, translation.
IPRP issued in International Patent Application No. PCT/JP2021/047024, Jul. 6, 2023, translation.

* cited by examiner

*Primary Examiner* — Vishal V Vasisth
(74) *Attorney, Agent, or Firm* — GREENBLUM & BERNSTEIN, P.L.C.

(57) ABSTRACT

A refrigerating machine oil containing a hydrocarbon base oil having a 90% distillation temperature of 270° C. or lower.

11 Claims, No Drawings

REFRIGERATOR OIL AND WORKING FLUID COMPOSITION FOR REFRIGERATOR

This application is a 371 of PCT/JP2021/047024 filed Dec. 20, 2021.

TECHNICAL FIELD

The present invention relates to a refrigerating machine oil and a working fluid composition for a refrigerating machine oil.

BACKGROUND ART

In refrigerating machines, it is increasingly desirable to replace refrigerants having relatively high global warming potential (GWP) with low GWP refrigerants, for example less than 150. Examples of the low GWP refrigerants include carbon dioxide (R744) refrigerant and hydrocarbon refrigerants.

On the other hand, the refrigerating machine is also required to save energy. In general, as viscosity of the refrigerating machine oil is lower, the stirring resistance and the friction of the sliding portion can be reduced. Therefore, the lowering of viscosity of the refrigerating machine oil leads to energy saving of the refrigerating machine. For example, Patent Document 1 discloses a refrigerating machine oil of VG3 or more and VG8 or less. Further, for example, Patent Document 2 discloses a refrigerating machine oil containing a mixed base oil composed of a low-viscosity base oil and a high-viscosity base oil.

CITATION LIST

Patent Literature

Patent Document 1: International Publication No. 2006/062245
Patent Document 2: International Publication No. 2007/105452

SUMMARY OF INVENTION

Technical Problem

However, when the viscosity of the refrigerating machine oil is low, it is difficult to hold the oil film in the sliding portion, and thus, for example, friction coefficient may increase. Accordingly, an aspect of the present disclosure is to provide a refrigerating machine oil capable of reducing friction coefficient while having low viscosity.

Solution to Problem

One aspect of the present invention is a refrigerating machine oil containing a hydrocarbon base oil having a 90% distillation temperature of 270° C. or lower.

The hydrocarbon base oil may have an initial boiling point of 140° C. or higher. The refrigerating machine oil may further comprise a phosphorus-containing antiwear agent. The refrigerating machine oil may have a flash point of 70° C. or higher. A content of a hydrocarbon having 12 to 16 carbon atoms in a hydrocarbon base oil contained in the refrigerating machine oil may be 80% by mass or more. The refrigerating machine oil may have a difference between a 90% distillation temperature and a 10% distillation temperature of 5° C. or higher and 40° C. or lower. The refrigerating machine oil may have a carbon residue of 10% residual oil of 0.02% by mass or more. A content of a n-paraffin in a hydrocarbon base oil contained in the refrigerating machine oil may be 5% by mass or more and 50% by mass or less. The refrigerating machine oil may have a 90% distillation temperature of 270° C. or lower.

Another aspect of the present invention may be a working fluid composition for a refrigerating machine oil containing the above refrigerating machine oil and a refrigerant. The refrigerant may contain a hydrocarbon.

Advantageous Effects of Invention

According to an aspect of the present invention, it is possible to provide a refrigerating machine oil capable of reducing friction coefficient while having low viscosity.

DESCRIPTION OF EMBODIMENTS

Hereinafter, embodiments of the present invention will be described in detail. One embodiment of the present invention is a refrigerating machine oil containing a hydrocarbon base oil having a 90% distillation temperature of 270° C. or lower. In this refrigerating machine oil, by using the hydrocarbon base oil having the specific 90% distillation temperature, it is possible to reduce friction coefficient while having low viscosity. The 90% distillation temperature is measured according to the atmospheric pressure method described in JIS K2254:2018. Hereinafter, the distillation characteristics of the hydrocarbon base oil and the refrigerating machine oil are similarly measured in accordance with this method.

The 90% distillation temperature (T90) of the hydrocarbon base oil may be preferably 267° C. or lower, 266° C. or lower, 265° C. or lower, 264° C. or lower, 263° C. or lower, 262° C. or lower, or 261° C. or lower, from the viewpoint of further reducing friction coefficient, and may be, for example, 220° C. or higher, 230° C. or higher, 240° C. or higher, 245° C. or higher, or 250° C. or higher.

The initial boiling point (IBP) of the hydrocarbon base oil may be preferably 140° C. or higher, 170° C. or higher, 190° C. or higher, 200° C. or higher, 210° C. or higher, 220° C. or higher, 230° C. or higher, or 240° C. or higher, and may be 260° C. or lower, 255° C. or lower, or 250° C. or lower, from the viewpoint of further reducing friction coefficient.

The 10% distillation temperature (T10) of the hydrocarbon base oil may be preferably 200° C. or higher, 210° C. or higher, 220° C. or higher, 230° C. or higher, or 240° C. or higher, and may be 260° C. or lower, 255° C. or lower, or 250° C. or lower, from the viewpoint of further reducing friction coefficient.

The 50% distillation temperature (T50) of the hydrocarbon base oil may be preferably 210° C. or higher, 220° C. or higher, 230° C. or higher, 240° C. or higher, or 245° C. or higher, and may be 265° C. or lower, 260° C. or lower, 255° C. or lower, or 250° C. or lower, from the viewpoint of further reducing friction coefficient.

The distillation end point (EP) of the hydrocarbon base oil may be preferably 250° C. or higher, 260° C. or higher, 270° C. or higher, 275° C. or higher, or 280° C. or higher, and may be 320° C. or lower, 310° C. or lower, 300° C. or lower, 295° C. or lower, or 290° C. or lower, from the viewpoint of further reducing friction coefficient.

The difference between the T10 and the T90 (T90-T10) of the hydrocarbon base oil may be preferably 5° C. or higher, 6° C. or higher, 7° C. or higher, 8° C. or higher, 9° C. or higher, or 10° C. or higher, and may be 40° C. or lower, 30° C. or lower, 20° C. or lower, or 15° C. or lower, from the viewpoint of further reducing friction coefficient.

The total distillation amount of the hydrocarbon base oil may be, for example, 95% by volume or more, 96% by volume or more, 97% by volume or more, 98% by volume or more, or 99% by volume or more, and may be 99.9% by volume or less. The residual oil amount of the hydrocarbon base oil may be, for example, 0.1% by volume or more, and may be 6% by volume or less, 4% by volume or less, 3% by volume or less, 2% by volume or less, or 1% by volume or less. The loss of the hydrocarbon base oil may be, for example, 1% by volume or less, 0.5% by volume or less, or 0.1% by volume or less, and may be 0% by volume.

The kinematic viscosity at 40° C. of the hydrocarbon base oil may be, for example, 1.0 $mm^2/s$ or higher, 1.5 $mm^2/s$ or higher, or 2.0 $mm^2/s$ or higher, and may be 6.0 $mm^2/s$ or lower, 5.0 $mm^2/s$ or lower, 4.5 $mm^2/s$ or lower, 4.0 $mm^2/s$ or lower, 3.5 $mm^2/s$ or lower, or 3.0 $mm^2/s$ or lower. The kinematic viscosity in the present specification means kinematic viscosity measured in accordance with JIS K2283: 2000.

The kinematic viscosity at 100° C. of the hydrocarbon base oil may be, for example, 0.5 $mm^2/s$ or higher, 0.7 $mm^2/s$ or higher, or 1.0 $mm^2/s$ or higher, and may be 2.0 $mm^2/s$ or lower, 1.5 $mm^2/s$ or lower, 1.4 $mm^2/s$ or lower, 1.3 $mm^2/s$ or lower, 1.2 $mm^2/s$ or lower, or 1.1 $mm^2/s$ or lower.

The density of the hydrocarbon base oil, for example, may be 0.78 $g/cm^3$ or more, 0.79 $g/cm^3$ or more, 0.80 $g/cm^3$ or more, 0.81 $g/cm^3$ or more, or 0.82 $g/cm^3$ or more, and may be 0.84 $g/cm^3$ or less, 0.83 $g/cm^3$ or less, 0.82 $g/cm^3$ or less, or 0.81 $g/cm^3$ or less. The density in the present specification means density at 15° C. measured in accordance with "Oscillating U-tube method" described in JIS K2249-1: 2011.

The flash point of the hydrocarbon base oil, for example, may be 30° C. or higher, 60° C. or higher, 90° C. or higher, 100° C. or higher, or 110° C. or higher, and may be 150° C. or lower, 140° C. or lower, or 130° C. or lower. By increasing the initial boiling point of the hydrocarbon base oil, the flash point can be increased and the safeness can be further increased. The flash point in the present specification means flash point measured in accordance with the Cleveland open cup (COC) method described in JIS K2265-4: 2007.

The pour point of the hydrocarbon base oil, for example, may be –10° C. or lower, –20° C. or lower, –30° C. or lower, or –40° C. or lower, and may be –60° C. or higher. The pour point in the present specification means pour point measured in accordance with JIS K2269:1987.

Examples of the hydrocarbon base oil having the characteristics described above include a mineral oil-based hydrocarbon base oil, a synthetic hydrocarbon base oil, and a mixed base oil thereof. Examples of the mineral oil-based hydrocarbon base oil include paraffinic or naphthenic refined mineral oils obtained by refining crude oil or distillation residue oil thereof as a raw material by appropriately combining ordinary petroleum refining treatments (solvent deasphalting, solvent extraction, hydrocracking, solvent dewaxing, catalytic dewaxing, hydrorefining, sulfuric acid washing, clay treatment, distillation, and the like). Examples of the synthetic hydrocarbon base oil include poly-α-olefins or hydrogenated products thereof, isoparaffins, alkylbenzenes, and alkylnaphthalenes. These hydrocarbon base oils may be used alone or in combination of two or more thereof.

From the viewpoint of easily obtaining the above-described characteristics, the hydrocarbon base oil is preferably a mineral oil-based hydrocarbon base oil. More specifically, the hydrocarbon base oil having the above-described characteristics is easily obtained by hydrorefining and fractionating a light and gas oil fraction obtained by atmospheric distillation of crude oil or a cracked gas oil fraction obtained by cracking a residual oil feedstock containing atmospheric residual oil of crude oil or vacuum residual oil thereof so that hydrocarbons having the above-described distillation characteristics, particularly 12 to 16 carbon atoms or 13 to 18 carbon atoms, become the main component (for example, 50% by mass or more, particularly 80% by mass or more).

The refrigerating machine oil may consist of a hydrocarbon base oil having the characteristics described above (hereinafter also referred to as "hydrocarbon base oil A") as base oil, or may further contain an additional base oil in addition to the hydrocarbon base oil A. The content of the hydrocarbon base oil A may be 50% by mass or more, 70% by mass or more, 90% by mass or more, or 95% by mass or more, based on the total amount of the base oil contained in the refrigerating machine oil. The content of the hydrocarbon base oil A may be 50% by mass or more, 70% by mass or more, 90% by mass or more, or 95% by mass or more, based on the total amount of the refrigerating machine oil.

The additional base oil may be, for example, an additional hydrocarbon base oil other than the hydrocarbon base oil having the above-described characteristics (hereinafter also referred to as "hydrocarbon base oil B"), an oxygen-containing base oil, or the like, and is preferably the hydrocarbon base oil B. The hydrocarbon base oil B may be, for example, a hydrocarbon base oil having a kinematic viscosity (e.g., 40° C. kinematic viscosity, 100° C. kinematic viscosity) higher than that of the hydrocarbon base oil A.

The kinematic viscosity at 40° C. of the hydrocarbon base oil B may be, for example, 100 $mm^2/s$ or higher, 200 $mm^2/s$ or higher, 300 $mm^2/s$ or higher, 400 $mm^2/s$ or higher, or 450 $mm^2/s$ or higher, and may be 1000 $mm^2/s$ or lower, 800 $mm^2/s$ or lower, 600 $mm^2/s$ or lower, or 500 $mm^2/s$ or lower.

The kinematic viscosity at 100° C. of the hydrocarbon base oil B, for example, may be 10 $mm^2/s$ or higher, 20 $mm^2/s$ or higher, or 30 $mm^2/s$ or higher, and may be 100 $mm^2/s$ or lower, 50 $mm^2/s$ or lower, or 40 $mm^2/s$ or lower.

The viscosity index of the hydrocarbon base oil B, for example, may be 0 or higher, 50 or higher, or 80 or higher, and 300 or lower, 140 or lower, or 100 or lower. The viscosity index in the present specification means viscosity index measured in accordance with JIS K2283:2000.

The flash point of the hydrocarbon base oil B, for example, may be 200° C. or higher, 250° C. or higher, or 300° C. or higher, and may be 500° C. or lower, 450° C. or lower, or 400° C. or lower.

As the hydrocarbon base oil B, those having the above-mentioned characteristics are preferable, and are not particularly limited. For example, a residual-oil-based hydrocarbon substrate in a crude oil refining process can be used. Examples of the residual oil hydrocarbon base material include atmospheric distillation residual oil of crude oil, vacuum distillation residual oil of the atmospheric distillation residual oil, deasphalted oil of these residual oils by propane or the like, solvent extracted extract oil of the deasphalted oil by fua rfural or the like, solvent extracted raffinate oil of the deasphalted oil, and refined oil obtained by subjecting these oils to refining treatment such as hydrocracking, hydrorefining, solvent dewaxing, or hydrodewaxing. Among them, particularly preferred is a refined oil obtained by hydrorefining a solvent-extracted raffinate of a deasphalted oil of a vacuum distillation residual oil, followed by solvent dewaxing or hydrodewaxing.

The carbon residue of the hydrocarbon base oil B is not particularly limited, but may be preferably 0.1% by mass or more, 0.2% by mass or more, or 0.3% by mass or more, and may be preferably 10% by mass or less, 5% by mass or less, 1% by mass or less, or 0.8% by mass or less, from the viewpoint of further improving antiwear property.

The ASTM color of the hydrocarbon base oil B may be 6.0 or less, 4.0 or less, or 3.0 or less, may be L0.5, or may be 0.5 or more, or 1.0 or more, from the viewpoint of hue of the refrigerating machine oil.

The content of the additional base oil (preferably the hydrocarbon base oil B) may be 0.5% by mass or more, 1% by mass or more, 2% by mass or more, or 3% by mass or more, and may be 50% by mass or less, 30% by mass or less, 10% by mass or less, or 5% by mass or less, based on the total amount of the base oil contained in the refrigerating machine oil. The content of the additional base oil (preferably the hydrocarbon base oil B) may be 0.5% by mass or more, 1% by mass or more, 2% by mass or more, or 3% by mass or more, and may be 50% by mass or less, 30% by mass or less, 10% by mass or less, or 5% by mass or less, based on the total amount of the refrigerating machine oil.

The refrigerating machine oil may further contain an additive in addition to the above-mentioned base oil. Examples of the additive include an antiwear agent, an antioxidant, an acid scavenger, an extreme pressure agent, a metal deactivator, a pour point depressant, and a detergent dispersant. The content of these additives may be 10% by mass or less or 5% by mass or less, based on the total amount of the refrigerating machine oil.

From the viewpoint of improving antiwear property, the refrigerating machine oil preferably contains an antiwear agent as an additive. Examples of the antiwear agent include a phosphorus-containing antiwear agent. Examples of the phosphorus-containing antiwear agent include phosphoric acid esters, thiophosphoric acid esters, acidic phosphoric acid esters, amine salts of acidic phosphoric acid esters, and chlorinated phosphoric acid esters. The antiwear agent (preferably phosphorus-containing antiwear agent) may be used alone or in combination of two or more. The phosphorus-containing antiwear agent is preferably one or two or more selected from phosphoric acid esters and thiophosphoric acid esters.

Examples of the phosphoric acid ester include tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritetradecyl phosphate, tripentadecyl phosphate, trihexadecyl phosphate, triheptadecyl phosphate, trioctadecyl phosphate, trioleyl phosphate, triphenyl phosphate, tricresyl phosphate, tri(ethylphenyl) phosphate, tri(butylphenyl) phosphate, trixylenyl phosphate, cresyl diphenyl phosphate, and xylenyl diphenyl phosphate. The phosphoric acid ester is preferably triphenyl phosphate or tricresyl phosphate.

Examples of the thiophosphoric acid ester include tributyl phosphorothionate, tripentyl phosphorothionate, trihexyl phosphorothionate, triheptyl phosphorothionate, trioctyl phosphorothionate, trinonyl phosphorothionate, tridecyl phosphorothionate, triundecyl phosphorothionate, tridodecyl phosphorothionate, tritridecyl phosphorothionate, tritetradecyl phosphorothionate, tripentadecyl phosphorothionate, trihexadecyl phosphorothionate, triheptadecyl phosphorothionate, trioctadecyl phosphorothionate, trioleyl phosphorothionate, triphenyl phosphorothionate, tricresyl phosphorothionate, trixylenyl phosphorothionate, cresyl diphenyl phosphorothionate and xylenyl diphenyl phosphorothionate. The thiophosphate ester is preferably triphenylphosphorothionate.

The content of the antiwear agent (preferably phosphorus-containing antiwear agent) may be, for example, 0.1% by mass or more, 0.5% by mass or more, or 1% by mass or more, and may be 5% by mass or more and 4% by mass or less, or 3% by mass or less, based on the total amount of the refrigerating machine oil.

The initial boiling point (IBP) of the refrigerating machine oil may be preferably 140° C. or higher, 170° C. or higher, 190° C. or higher, 200° C. or higher, 210° C. or higher, 220° C. or higher, 230° C. or higher, or 240° C. or higher, and may be 260° C. or lower, 255° C. or lower, or 250° C. or lower, from the viewpoint of further reducing friction coefficient.

The 10% distillation temperature (T10) of the refrigerating machine oil may be preferably 200° C. or higher, 210° C. or higher, 220° C. or higher, 230° C. or higher, or 240° C. or higher, and may be 260° C. or lower, 255° C. or lower, or 250° C. or lower, from the viewpoint of further reducing friction coefficient.

The 50% distillation temperature (T50) of the refrigerating machine oil may be preferably 210° C. or higher, 220° C. or higher, 230° C. or higher, 240° C. or higher, or 245° C. or higher, and may be 265° C. or lower, 260° C. or lower, 255° C. or lower, or 250° C. or lower, from the viewpoint of further reducing friction coefficient.

The 90% distillation temperature (T90) of the refrigerating machine oil may be preferably 220° C. or higher, 230° C. or higher, 240° C. or higher, 245° C. or higher, or 250° C. or higher, and may be 270° C. or lower, 267° C. or lower, 266° C. or lower, 265° C. or lower, 264° C. or lower, 263° C. or lower, 262° C. or lower, or 261° C. or lower, from the viewpoint of further reducing friction coefficient.

The distillation end point (EP) of the refrigerating machine oil may be preferably 250° C. or higher, 260° C. or higher, 270° C. or higher, 275° C. or higher, or 280° C. or higher, and may be 320° C. or lower, 310° C. or lower, 300° C. or lower, 295° C. or lower, or 290° C. or lower, from the viewpoint of further reducing friction coefficient.

The difference between the T90 and the T10 of the refrigerating machine oil (T90-T10) may be preferably 5° C. or higher, 6° C. or higher, 7° C. or higher, 8° C. or higher, 9° C. or higher, or 10° C. or higher, and may be 40° C. or lower, 30° C. or lower, 20° C. or lower, or 15° C. or lower, from the viewpoint of further reducing friction coefficient.

The total distillation amount of the refrigerating machine oil may be, for example, 90% by volume or more, 93% by volume or more, or 95% by volume or more, and may be 99% by volume or less. The residual oil amount of the refrigerating machine oil may be, for example, 1% by volume or more, and may be 10% by volume or less, 7% by volume or less, or 5% by volume or less. The loss amount of the refrigerating machine oil may be, for example, 1% by volume or less, 0.5% by volume or less, or 0.1% by volume or less, and may be 0% by volume.

The kinematic viscosity at 40° C. of the refrigerating machine oil may be, for example, 1.0 mm$^2$/s or higher, 1.5 mm$^2$/s or higher, or 2.0 mm$^2$/s or higher, and 6.0 mm$^2$/s or lower, 5.0 mm$^2$/s or lower, 4.5 mm$^2$/s or lower, 4.0 mm$^2$/s or lower, 3.5 mm$^2$/s or lower, or 3.0 mm$^2$/s or lower.

The kinematic viscosity at 100° C. of the refrigerating machine oil may be, for example, 0.5 mm$^2$/s or higher, 0.7 mm$^2$/s or higher, or 1.0 mm$^2$/s or higher, and 2.0 mm$^2$/s or lower, 1.5 mm²/s or lower, 1.4 mm²/s or lower, 1.3 mm²/s or lower, 1.2 mm²/s or lower, or 1.1 mm²/s or lower.

The density of the refrigerating machine oil may be, for example, 0.78 g/cm³ or more, 0.79 g/cm³ or more, or 0.80 g/cm³ or more, and may be 0.85 g/cm³ or less, 0.84 g/cm³ or less, or 0.83 g/cm³ or less.

The flash point of the refrigerating machine oil may be, for example, 70° C. or higher, 80° C. or higher, 90° C. or higher, 100° C. or higher, or 110° C. or higher, and may be 150° C. or lower, 140° C. or lower, or 130° C. or lower.

The pour point of the refrigerating machine oil may be, for example, −10° C. or lower, −20° C. or lower, −30° C. or lower, or −40° C. or lower, and may be −60° C. or higher.

The carbon residue of 10% residual oil of the refrigerating machine oil may be preferably 0.01% by mass or more, 0.02% by mass or more, 0.05% by mass or more, 0.08% by mass or more, or 0.1% by mass or more, and may be, for example, 0.6% by mass or less, 0.5% by mass or less, or 0.4% by mass or less. The carbon residue in the present specification means carbon residue measured by the Micro method in accordance with JIS K2270-2:2009. The carbon residue of 10% residual oil in the present specification means carbon residue measured by the same method for residual oil obtained by distilling a refrigerating machine oil and removing distillate oil having a volume fraction of up to 90%.

The content of hydrocarbon having 12 to 16 carbon atoms in the refrigerating machine oil or in the hydrocarbon base oil contained in the refrigerating machine oil (amount of C12-16 components) may be preferably 80% by mass or more, 85% by mass or more, or 90% by mass or more, and 97% by mass or less, 96% by mass or less, or 95% by mass or less, based on the total amount of the hydrocarbon base oil, from the viewpoint of further reducing friction coefficient.

The content of hydrocarbons having 13 to 18 carbon atoms in the refrigerating machine oil or in the hydrocarbon base oil contained in the refrigerating machine oil (amount of C13-18 components) may be preferably 80% by mass or more, 85% by mass or more, or 90% by mass or more, and 99% by mass or less, 98% by mass or less, or 97% by mass or less, based on the total amount of the hydrocarbon base oil, from the viewpoint of further reducing friction coefficient.

The content of n-paraffin in the refrigerating machine oil or in the hydrocarbon base oil contained in the refrigerating machine oil may be preferably 0.5% by mass or more, 2% by mass or more, 5% by mass or more, 8% by mass or more, or 9% by mass or more, more preferably 10% by mass or more, 15% by mass or more or 20% by mass or more, and 50% by mass or less, 30% by mass or less, or 25% by mass or less, based on the total amount of the hydrocarbon base oil from the viewpoint of further reducing friction coefficient.

The content of paraffin in the refrigerating machine oil or in the hydrocarbon base oil contained in the refrigerating machine oil may be preferably 30% by mass or more, 40% by mass or more, 50% by mass or more, 55% by mass or more, or 60% by mass or more, and may be 100% by mass or less, 90% by mass or less, or 80% by mass or less, based on the total amount of the hydrocarbon base oil, from the viewpoint of further reducing friction coefficient.

The content of 1-ring to 6-ring cycloparaffin (hereinafter simply referred to as "cycloparaffin") in the refrigerating machine oil or in the hydrocarbon base oil contained in the refrigerating machine oil may be preferably 70% or less, 60% by mass or less, 50% by mass or less, 45% by mass or less, or 40% by mass or less, or 0% by mass or more, 10% by mass or more, 20% by mass or more, 30% by mass or more, or 35% by mass or more, based on the total amount of the hydrocarbon oil, from the viewpoint of further reducing friction coefficient.

The ratio of the paraffin to the cycloparaffin (paraffin/cycloparaffin) may be preferably 0.3 or more, 0.6 or more, 1.0 or more, 1.2 or more, 1.4 or more, 1.5 or more, or 1.8 or more, and may be preferably 100 or less, 50 or less, 10 or less, 5 or less, or 4 or less, from the viewpoint of further reducing friction coefficient.

The aromatic content in the refrigerating machine oil or in the hydrocarbon base oil contained in the refrigerating machine oil may be preferably 10% by mass or less, 5% by mass or less, 3% by mass or less, or 1% by mass or less, from the viewpoint of further reducing friction coefficient.

In the present specification, the contents of hydrocarbons having 12 to 16 carbon atoms, hydrocarbons having 13 to 18 carbon atoms, n-paraffins, paraffins, cycloparaffins, and aromatic hydrocarbon oils in the refrigerating machine oil or in the hydrocarbon base oil contained in the refrigerating machine oil are determined by fractionating a sample to be analyzed into a saturated hydrocarbon oil and an aromatic hydrocarbon oil by silica gel chromatography, and subjecting each to hydrocarbon type analysis by GC-TOFMS combined with gas chromatography and mass spectrometry by FI ionization. Examples of analysis conditions are shown below. The contents of the saturated hydrocarbon oil and the aromatic hydrocarbon oil may be determined by fractionation using the silica gel chromatography.

(Gas Chromatography Conditions)
    Column: ZB-1MS manufactured by phenomenex
    Injection temperature: 350° C.
    Temperature rise condition: 50° C. to 350° C. (temperature rise rate: 5° C./min)
    Carrier gas: helium
    Injection method: split sample injection amount: 1 μL (10% toluene solution)

(MS Conditions)
    Counter electrode voltage: −10 kV
    Ionization method: FI (field ionization)
    Ion source temperature: room temperature
    Mass number measurement range: m/z 35 to 500

In the mass spectra obtained as a result of GC-TOFMS analysis, the percentage of ion intensity for each type of carbon atoms ($C_nH_{2n+z}$, wherein n is an integer and z is an even number of −18 to 2) can be determined from the percentage of total ion intensity. When the aromatic hydrocarbon content of the sample fractionated by the silica gel chromatography is less than 1% by mass, the chromatographic fractionation may be omitted and the hydrocarbon type analysis by the GC-TOFMS method may be performed. In this case, the content of each component is calculated assuming that all components are saturated hydrocarbon components.

The refrigerating machine oil according to the present embodiment may be mixed with a refrigerant and present in a state of working fluid composition for a refrigerating machine, in a refrigerating machine. That is, one embodiment of the present invention is a working fluid composition for a refrigerating machine containing the above refrigerating machine oil and a refrigerant. The content of the refrigerating machine oil in the working fluid composition for a refrigerating machine may be 1 part by mass or more or 2 parts by mass or more, and may be 500 parts by mass or less or 400 parts by mass or less, with respect to 100 parts by mass of the refrigerant.

The refrigerant preferably contains a hydrocarbon. The content of the hydrocarbon may be 50% by mass or more, 60% by mass or more, 70% by mass or more, 80% by mass or more, 90% by mass or more, or 95% by mass or more, based on the total amount of the refrigerant.

The hydrocarbon is preferably a hydrocarbon having 1 to 5 carbon atoms, and more preferably a hydrocarbon having 2 to 4 carbon atoms. Specific examples of the hydrocarbon include methane, ethylene, ethane, propylene, propane (R290), cyclopropane, n-butane, isobutane (R600a), cyclobutane, methylcyclopropane, 2-methylbutane, n-pentane, and a mixture of two or more thereof. The hydrocarbon is preferably a hydrocarbon which is gaseous at 25° C. and 1 atm, more preferably propane, normal butane, isobutane, 2-methylbutane or a mixture thereof.

The refrigerant may contain one or two or more selected from saturated hydrofluorocarbons, unsaturated hydrofluorocarbons, fluorine-containing ethers such as perfluoroethers, bis(trifluoromethyl)sulfide, trifluoroiodomethane, and natural refrigerants such as ammonia and carbon dioxide, in addition to or instead of the hydrocarbon.

Examples

Hereinafter, the present invention will be described in more detail based on examples, but the present invention is not limited to the following examples.

Hydrocarbon base oils A1 to A3 and a1 used in Examples and Comparative Examples are as follows. Since the aromatic content of these hydrocarbon base oils was less than 1% by mass, chromatographic fractionation was not carried out, and hydrocarbon type analysis by the above-mentioned GC-TOFMS method was directly carried out by regarding all as saturated hydrocarbons. The characteristics of these hydrocarbon base oils are shown in Table 1.

Hydrocarbon base oil A1: mineral oil-based hydrocarbon oil obtained by hydrorefining and fractionating a hydrocracking gas oil as a raw material containing a vacuum distillation residual oil (aromatic content <1% by mass, ASTM color: 0)

Hydrocarbon base oil A2: mineral oil-based hydrocarbon oil obtained by hydrodesulfurizing and fractionating an atmospheric distillation distillate of crude oil (aromatic content <1% by mass, ASTM color: 0)

Hydrocarbon base oil A3: mineral oil-based hydrocarbon oil obtained by hydrodesulfurizing and fractionating an atmospheric distillation distillate of crude oil (aromatic content <1% by mass, ASTM color: 0)

Hydrocarbon base oil a1: mineral oil-based hydrocarbon oil obtained by hydrorefining and fractionating a hydrocracking gas oil as a raw material containing a vacuum distillation residual oil (aromatic content <1% by mass, ASTM color: 0)

TABLE 1

| | | | Hydrocarbon base oil | | | |
|---|---|---|---|---|---|---|
| | | | A1 | A2 | A3 | a1 |
| Distillation characteristics | IBP | ° C. | 242 | 242 | 244.5 | 260.5 |
| | T10 | | 246 | 247.5 | 247.5 | 266.5 |
| | T50 | | 249 | 250 | 250 | 269.5 |
| | T90 | | 253 | 261 | 257.5 | 276 |
| | EP | | 282 | 292 | 278 | 282 |
| | T90 − T10 | | 7.0 | 13.5 | 10 | 9.5 |
| | Total distillation amount | % by volume | 99 | 99 | 98 | 99 |
| | Residual oil amount | | 1 | 1 | 1 | 1 |
| | Loss amount | | 0 | 0 | 1 | 0 |
| Kinematic viscosity | 40° C. | mm$^2$/s | 2.44 | 2.32 | 2.357 | 3.30 |
| | 100° C. | | 1.1 | 1.0 | 1.029 | 1.3 |
| Density | | g/cm$^3$ | 0.827 | 0.806 | 0.8013 | 0.839 |
| Flash point | | ° C. | 116 | 118 | 118 | 128 |
| Pour point | | ° C. | <−45 | <−45 | −25 | −37.5 |
| Amount of C12-16 components | | % by mass | 97.1 | 93.9 | 94.2 | 75.1 |
| Amount of C13-C18 components | | % by mass | 99.5 | 99.4 | 99.3 | 99.4 |
| Amount of n-paraffin | | % by mass | 1.2 | 9.6 | 23.6 | 3.7 |
| Amount of paraffin | | % by mass | 45 | 68 | 59 | 20 |
| Amount of cycloparaffin | | % by mass | 55 | 32 | 41 | 80 |
| Paraffin/cycloparaffin | | — | 0.8 | 2.1 | 1.44 | 0.24 |

The solvent-extracted raffinate of the deasphalted oil of the vacuum distillation residual oil was hydrorefined and subjected to solvent dewaxing to obtain the hydrocarbon base oil B having the following characteristics.

Hydrocarbon base oil B1 (40° C. kinematic viscosity: 479.4 mm$^2$/s, 100° C. kinematic viscosity: 31.72 mm$^2$/s, viscosity index: 97, flash point: >300° C., carbon residue: 0.51% by mass, ASTM color: L2.0)

Hydrocarbon base oil B2 (40° C. kinematic viscosity: 458 mm$^2$/s, 100° C. kinematic viscosity: 31.2 mm$^2$/s, viscosity index 98, flash point: >300° C., carbon residue: 0.5% by mass, ASTM color: L2.0)

These hydrocarbon base oils were used to prepare base oils having the compositions (% by mass based on the total amount of base oil) shown in Table 2. Refrigerating machine oils were prepared by mixing 98.3% by mass of each base oil and 1.7% by mass of a phosphorus-containing antiwear agent composed of a mixture of tricresyl phosphate and triphenyl phosphorothionate (all based on the total amount of the refrigerating machine oil). The hydrocarbon type analysis was performed on the hydrocarbon base oil contained in each refrigerating machine oil, and the results are shown in Table 2. The characteristics of the each refrigerating machine oil are also shown in Table 2.

[Evaluation of Friction Property]

In order to evaluate frictional property of each of the refrigerating machine oils of Examples and Comparative Examples, the following tests were performed.

Using an MTM (Mini Traction Machine) tester (manufactured by PCS Instruments), friction coefficient ($\mu$) in the lubrication region corresponding to the elastic fluid lubrication region or the mixed lubrication region was measured under the following conditions. The results are shown in Table 3. The smaller the friction coefficient is, the more excellent friction property is.

Balls and disks: standard test specimens (AISI 52100 standard)

Test temperature: 40° C.

Sliding speed: 0.3 to 0.9 m/s (partially extracted)

Load: 10N

Slip ratio: 30%

The value $|U_D-U_B|$ [m/s] was used as sliding speed. Here, $U_D$ is speed [m/s] of the disk in the sliding part, and $U_B$ is speed [m/s] of the ball in the sliding part.

TABLE 2

|  |  |  | Example | | | | | | | Comparative Example |
|---|---|---|---|---|---|---|---|---|---|---|
|  |  |  | 1 | 2 | 3 | 4 | 5 | 6 | 7 | 1 |
| Composition | A1 |  | 98 | 96 | 98 | 96 | — | — | — | — |
| of base oil | A2 |  | — | — | — | — | 100 | 98 | 95 | — |
| (% by mass) | a1 |  | — | — | — | — | — | — | — | 100 |
|  | B1 |  | 2 | 4 | — | — | — | 2 | 5 | — |
|  | B2 |  | — | — | 2 | 4 | — | — | — | — |
| Amount of C12-16 components |  |  | 95.2 | 93.2 | 95.2 | 93.2 | 93.9 | 92.0 | 89.2 | 75.1 |
| Amount of C13-C18 components | % by mass |  | 97.4 | 95.5 | 97.4 | 95.5 | 99.4 | 97.4 | 94.4 | 99.4 |
| Amount of n-paraffin |  |  | 1.2 | 1.2 | 1.2 | 1.2 | 9.6 | 9.4 | 9.1 | 3.7 |
| Amount of paraffin | % by mass |  | 44 | 44 | 44 | 44 | 68 | 67 | 66 | 20 |
| Amount of cycloparaffin | % by mass |  | 56 | 56 | 56 | 56 | 32 | 33 | 34 | 80 |
| Paraffin/ cycloparaffin | — |  | 0.8 | 0.8 | 0.8 | 0.8 | 2.1 | 2.0 | 1.9 | 0.24 |
| Distillation characteristics | IBP | ° C. | 242.5 | 241 | 242 | 241 | 242 | 242 | 242 | 260.5 |
|  | T10 |  | 246 | 246 | 246 | 246 | 247.5 | 247.5 | 247.5 | 266.5 |
|  | T50 |  | 249.5 | 249.5 | 249.5 | 249.5 | 250 | 250 | 250 | 269.5 |
|  | T90 |  | 256.5 | 258 | 256 | 258.5 | 261 | 262 | 265 | 276 |
|  | EP |  | 284 | 285 | 285 | 284 | 292 | 294 | 295 | 282 |
| T90 − T10 |  |  | 10.5 | 12.0 | 10.0 | 12.5 | 13.5 | 14.5 | 17.5 | 9.5 |
| Total distillation amount | % by volume |  | 97 | 96 | 97 | 95.5 | 97 | 97 | 95 | 97.5 |
| Residual oil amount |  |  | 3 | 4 | 3 | 4.5 | 3 | 3 | 5 | 2 |
| Loss amount |  |  | 0 | 0 | 0 | 0 | 0 | 0 | 0 | 0.5 |
| Kinematic viscosity | 40° C. | mm$^2$/s | 2.61 | 2.79 | 2.61 | 2.79 | 2.32 | 2.52 | 2.80 | 3.30 |
|  | 100° C. |  | 1.1 | 1.2 | 1.1 | 1.2 | 1.0 | 1.1 | 1.2 | 1.3 |
| Density |  | g/cm$^3$ | 0.827 | 0.829 | 0.828 | 0.829 | 0.806 | 0.808 | 0.811 | 0.839 |
| Flash point |  | ° C. | 116 | 116 | 116 | 116 | 118 | 118 | 118 | 128 |
| Pour point |  | ° C. | <−45 | <−45 | <−45 | <−45 | <−45 | <−45 | <−45 | −37.5 |
| Carbon residue of 10% residual oil | % by mass |  | 0.1 | 0.21 | 0.1 | 0.2 | <0.01 | 0.1 | 0.25 | <0.01 |

TABLE 3

| | Sliding speed | Example | | | | | | | Comparative Example |
|---|---|---|---|---|---|---|---|---|---|
| | (m/s) | 1 | 2 | 3 | 4 | 5 | 6 | 7 | 1 |
| Friction coefficient | 0.9 | 0.016 | 0.017 | 0.018 | 0.017 | 0.008 | 0.009 | 0.010 | 0.025 |
| | 0.75 | 0.016 | 0.017 | 0.018 | 0.017 | 0.009 | 0.010 | 0.010 | 0.024 |
| | 0.6 | 0.017 | 0.018 | 0.019 | 0.017 | 0.009 | 0.010 | 0.010 | 0.025 |
| | 0.45 | 0.017 | 0.020 | 0.021 | 0.018 | 0.010 | 0.010 | 0.011 | 0.026 |
| | 0.3 | 0.020 | 0.023 | 0.024 | 0.021 | 0.012 | 0.012 | 0.014 | 0.029 |

Furthermore, in each of Examples 5 to 7, the hydrocarbon base oil A3 was used instead of the hydrocarbon base oil A2 to prepare each of the refrigerating machine oils of Examples 8 to 10. In the obtained refrigerating machine oils of Examples 8 to 10, the amount of n-paraffin was larger and the pour point was slightly higher than those of the refrigerating machine oils of Examples 5 to 7, but further reduction of the friction coefficient was observed.

(Low Temperature Precipitation Test in Presence of Refrigerant)

The refrigerating machine oils of Examples 1 to 10 were subjected to a low-temperature precipitation test according to Appendix A of JIS K2211 (2009), using R600a that is a hydrocarbon refrigerant, as the refrigerant. In the mixed fluid of the refrigerating machine oils of Examples 1 to 10 and R600a, hair-like precipitates, granular precipitates, cloudiness, or cloudiness did not occur, and a tendency to precipitate at low temperatures was not observed, when the refrigerating machine oil/refrigerant ratio (mass ratio) was in the range of 1/99 to 99/1 and even when the mixed fluid was cooled to −40° C.

The invention claimed is:

1. A working fluid composition for a refrigerating machine, comprising:
   a refrigerating machine oil comprising a hydrocarbon base oil having a 90% distillation temperature of 270° C. or lower and a distillation end point of 295° C. or lower; and
   a refrigerant,
   wherein the refrigerating machine oil has a difference between a 90% distillation temperature and a 10% distillation temperature of 5° C. or higher and 20° C. or lower, and wherein the hydrocarbon base oil has a density at 15° C. of 0.81 g/cm³ or more.

2. The working fluid composition according to claim 1, wherein the hydrocarbon base oil has an initial boiling point of 140° C. or higher.

3. The working fluid composition according to claim 1, wherein the refrigerating machine oil further comprises a phosphorus-containing antiwear agent.

4. The working fluid composition according to claim 1, wherein the refrigerating machine oil has a flash point of 70° C. or higher.

5. A working fluid composition, comprising:
   a refrigerating machine oil comprising a hydrocarbon base oil having a 90% distillation temperature of 270° C. or lower and a distillation end point of 295° C. or lower; and
   a refrigerant,
   wherein the refrigerating machine oil has a difference between a 90% distillation temperature and a 10% distillation temperature of 5° C. or higher and 40° C. or lower, and
   wherein a content of a hydrocarbon having 12 to 16 carbon atoms in a hydrocarbon base oil contained in the refrigerating machine oil is 80% by mass or more, and wherein the hydrocarbon base oil has a density at 15° C. of 0.81 g/cm³ or more.

6. The working fluid composition according to claim 1, wherein a content of a n-paraffin in a hydrocarbon base oil contained in the refrigerating machine oil is 5% by mass or more and 50% by mass or less.

7. The working fluid composition according to claim 1, wherein the refrigerating machine oil has a 90% distillation temperature of 270° C. or lower.

8. The working fluid composition for a refrigerating machine oil of claim 1, wherein the refrigerant comprises a hydrocarbon.

9. The working fluid composition according to claim 1, wherein the hydrocarbon base oil has a density at 15° C. of 0.82 g/cm³ or more.

10. The working fluid composition according to claim 1, wherein a content of a n-paraffin in the hydrocarbon base oil is 9.6% by mass or less.

11. The working fluid composition according to claim 1, wherein the difference between the 90% distillation temperature and the 10% distillation temperature is 5° C. or higher and 15° C. or lower.

* * * * *